Oct. 8, 1940.   R. P. MONTGOMERY ET AL   2,217,376
RUFFLE PLAITER
Filed May 28, 1938   2 Sheets-Sheet 2
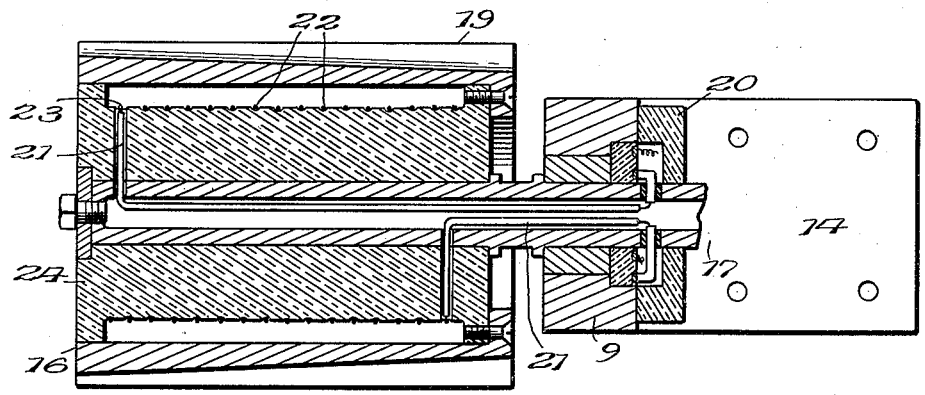
Fig. 3.
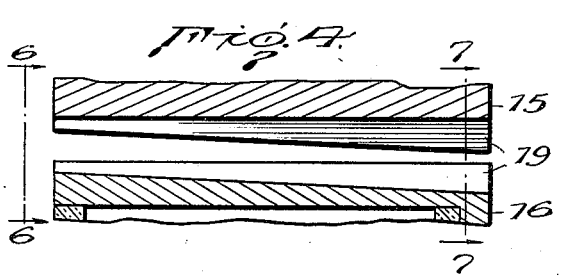
Fig. 4.
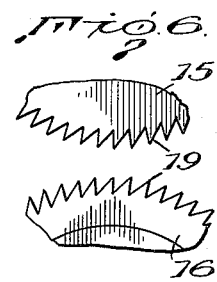
Fig. 6.
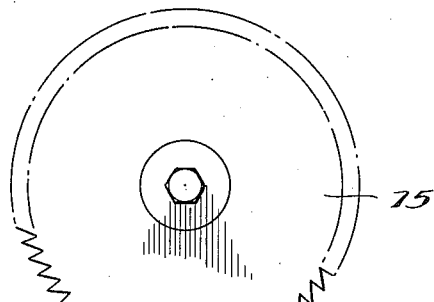
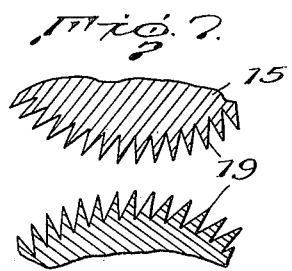
Fig. 7.
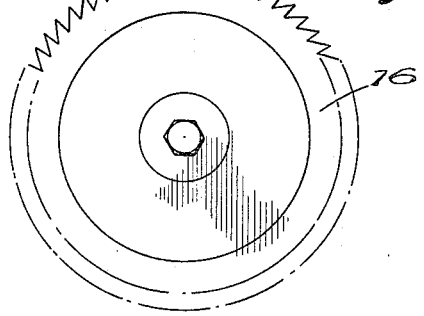
Fig. 5.
Inventors
Rose P. Montgomery
Gideon C. Montgomery
By Bernard F. Garvey
Attorney Patented Oct. 8, 1940

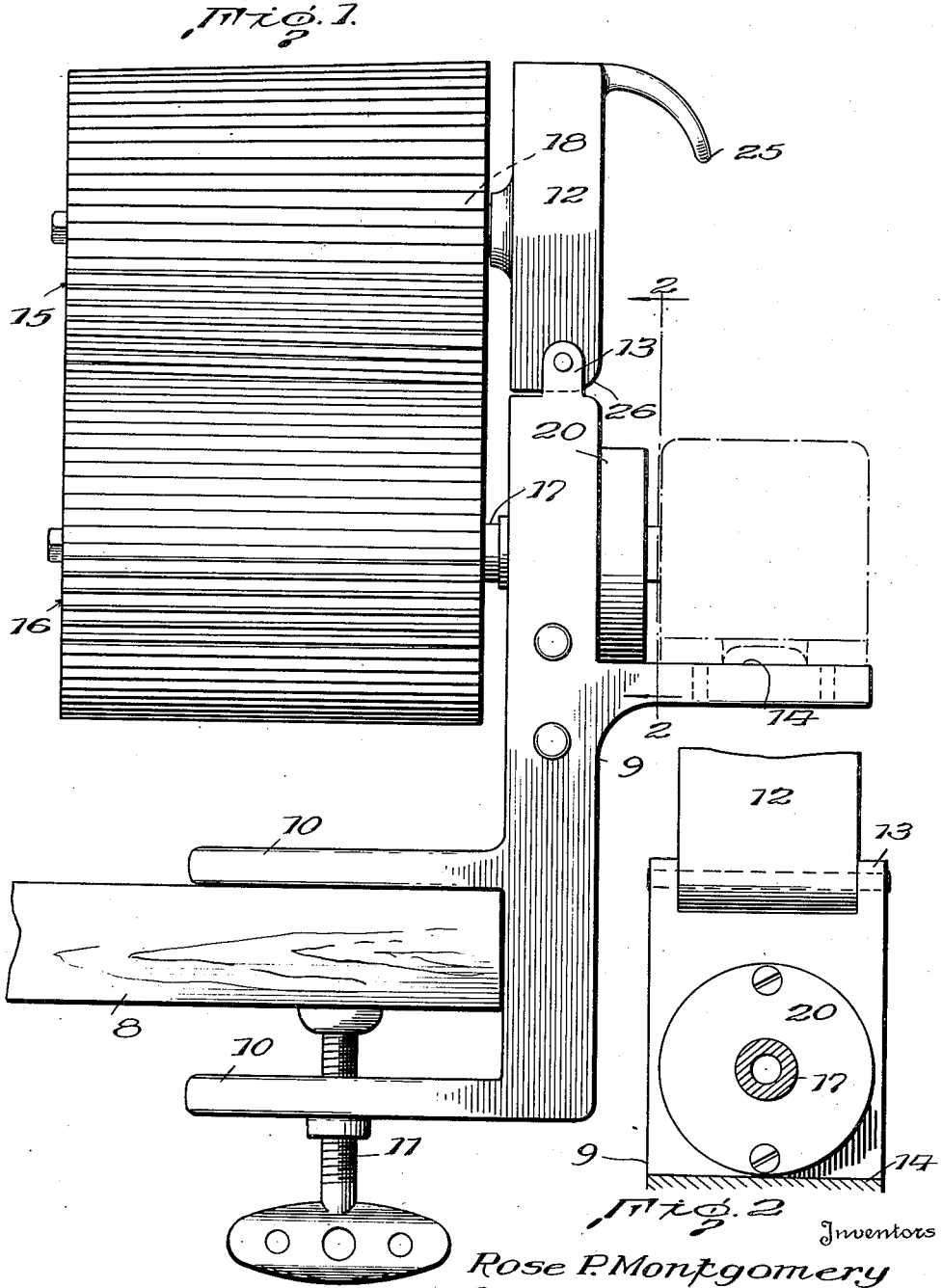

2,217,376

UNITED STATES PATENT OFFICE 2,217,376

RUFFLE PLAITER

Rose P. Montgomery and Gideon C. Montgomery, Philadelphia, Pa.

Application May 28, 1938, Serial No. 210,736

5 Claims. (Cl. 223—32)

The present invention consists of a ruffle plaiter especially adapted for use on curtains and feminine apparel, such as skirts, dresses, neckwear, children's dresses.

For many years it has been known in the art to provide heated fluting and plaiting rollers, but none of them have been used commercially. The machines heretofore adopted could be used only for straight plaits or flutes and made no provision for tapered or gathered plaits, wherein the plaits converge toward one end. After some experiment, we have found that by using parallel rollers, equipped with fluting or plaiting protuberances of gradually increasing depth, toward one end, the converging or tapering parts are ironed or pressed throughout their lengths, with facility and without possibility of damage to the fabric.

The above and other objects of the invention will be apparent from the following description of the present preferred forms of the invention, wherein Fig. 1 is a side elevational view of a ruffle plaiter constructed in accordance with the present invention illustrating its application, Fig. 2 is a detail fragmentary sectional view taken on the line 2—2 of Fig. 1, looking in the direction of the arrows, Fig. 3 is a longitudinal sectional view taken through the heating roller and also illustrating the manner of mounting the same in the frame, Fig. 4 is a detail fragmentary sectional view of the rollers showing the same disengaged, Fig. 5 is an end elevational view of the rollers in engaged position, Fig. 6 is a detail fragmentary sectional view taken on the line 6—6 of Fig. 4, looking in the direction of the arrows, and Fig. 7 is a similar view taken on the line 7—7 of Fig. 4, looking in the direction of the arrows.

In the drawings to illustrate the application of this invention, a support 8 is shown, to which is secured a roller supporting frame, generally designated 9. One end of the frame is formed to provide extensions 10 issuing from one side of said frame providing a U-shaped jaw which is slidable over the support 8, and secured to the latter by suitable means 11 which extends through one side of the jaw. The frame includes a hinged or pivoted part 12 which may be mounted between ears 13 formed on the fixed part of the frame and to which the part 12 is pivoted. The fixed part of the frame is provided with a lateral extension 14. The extension 14 forms a shelf which is adapted to support a motor. Upon reference to Fig. 1 of the drawings, it will be observed that the shelf 14 is formed on the fluting frame on the side opposite to that from which the extensions 10 issue, the shelf 14 being arranged approximately midway the ends of the fixed part of the frame, whereas the extensions 10 are at and adjacent one end of said fixed part.

The frame 9 is adapted to carry interengaging upper and lower rollers, 15 and 16, respectively. The lower roller is rotatably mounted on a shaft 17 carried by the fixed part of the frame 9, while the upper roller is rotatably mounted on a shaft 18 carried by the hinged part 12 of the frame. The rollers 15 and 16 are equipped on their respective peripheries with longitudinally extending ribs 19 which are preferably canted and of V-shape cross section.

By preference, the lower roller 16 is heated and for this purpose we employ an electrical contactor 20 for a heating element hereinafter described. The contactor is mounted on the shaft 17 outside of the fixed part of the frame 9 in superposed relation to the motor supporting shelf 14. The contactor 20 is engaged through circuit wires 21 with an electrical winding 22, the latter being countersunk in complemental helical recesses 23 formed in an insulated spool 24. The spool 24 is sleeved in and secured to the roller 16, preferably as shown in Fig. 3 of the drawings. Since the shaft 17 is hollow, the wires 21 may pass therethrough, as shown in Fig. 3. It is, of course, understood that the shaft 17 is engageable with a motor, in a manner well known in the art.

The lower roller 16 has a hollow main body portion which is of gradually decreasing external diameter toward its inner or supported end 16', the ribs 19 thereof being of substantially constant external diameter and of gradually increasing depth toward the inner end of the roller. Consequently, the outer peripheral diameter of the ribs on this roller 16 is constant throughout.

The outer peripheral diameter of the body portion of the upper roller 15 is constant throughout, while its ribs gradually increase in depth toward the inner or supported end of the roller; consequently the outer surface of revolution of this roller, including its ribs 19, is of gradually increasing diameter from the free end toward the supported end.

The ribs on roller 15 thereby complement the ribs of the roller 16, and positively effects completion of the fluting or plaiting operation at the converged or narrow ends of the plaits. The rollers are preferably parallelly arranged for better treatment of the material. Due to the shape of the rollers the shafts will be parallel or nearly so in the preferred construction.

Preferably, the upper roller 15 is solid and may be moved out of engagement with the roller 16 at the option of the operator. To facilitate disengagement of the upper roller, I provide an extension 25 on the free terminal of the hinged part 12 of the frame, said extension 25 serving as a finger piece. Also, it will be noted that the outer adjacent corners 26 of the frame 9 are rounded thereby permitting the part 12 of frame and the free roller to be moved into a position where the outer wall of the movable part of the frame is engaged with the free terminal of the fixed part of the frame.

By arranging the shelf 14 on the opposite side of the frame, to that upon which the jaw extensions 10 are formed, and by positioning said extension approximately midway the ends of the fixed part of the frame, a balance is effected on the opposite sides of the frame relieving the latter from undue stress and strain. Furthermore, by arranging the shelf in this manner, the motor mounted thereon may be used as a support for the free hinged part 12 of the frame when the latter has been moved into an inoperative position, in a manner as already herein set forth.

It is, of course, to be understood that various changes may be made herein, especially in the details of construction, proportion and arrangement of parts, within the scope of the claims hereto appended.

What is claimed is:

1. A ruffle plaiter including inter-engageable ribbed rollers comprising an articulated frame arranged to be secured to a support, said frame including a fixed part and a relatively movable part pivoted thereon, power means including a rotatably driven shaft mounted on the fixed part of said frame, a roller having a main body portion of gradually decreasing external diameter tapering toward one end thereof and fixed on said shaft, a second roller having its main body portion of constant outer diameter and rotatably supported on the movable part of said frame, longitudinal ribs extending outwardly from the main body portion of each roller, of increasing depth toward one end of each roller, and all the ribs tapering away from the supported end of both rollers, and the axes of said rollers being parallel when the rollers are interengaged.

2. A ruffle plaiter including inter-engageable ribbed rollers comprising an articulated frame having a fixed part and a relatively movable part, power means including a shaft rotatably mounted on one part of said frame, a roller having a body portion of decreasing external diameter mounted on said shaft, a second roller having a body portion of constant external diameter rotaably mounted on a shaft on the other part of said frame, and longitudinal ribs extending from the body portion of each roller and being of increasing depth toward a corresponding end of each roller.

3. A ruffle plaiter including inter-engageable rollers consisting of a frame having relatively movable parts, a rotatable shaft mounted on each part of said frame, rollers on said shafts, the body portion of one roller having a tapering diameter and that of the other being of constant diameter, ribs of increasing depth carried by both rollers, and said shafts being substantially parallel when said ribs are engaged.

4. A ruffle plaiter consisting of ribbed rollers rotatably mounted on substantially parallel axes, each roller provided with longitudinally extending ribs of tapering depth toward a corresponding end of each roller, one roller having a body portion of constant diameter and the other of tapering diameter, whereby the diameter to the outer extremities of the ribs in one roller tapers and that of the second is constant.

5. A ruffle plaiter including inter-engageable ribbed rollers consisting of a frame having relatively movable parts, a rotatable shaft mounted on each part of said frame, rollers on said shafts, the body portion of one roller having a tapering diameter and that of the other being of constant diameter, ribs of increasing depth carried by both rollers, and said ribs being longer on one side than on the other whereby the resulting material is formed into plaits.

ROSE P. MONTGOMERY.
GIDEON C. MONTGOMERY.